United States Patent
Maeda et al.

(10) Patent No.: US 7,080,523 B2
(45) Date of Patent: Jul. 25, 2006

(54) AIR CONDITIONING APPARATUS FOR VEHICLE

(75) Inventors: Kazunari Maeda, Kariya (JP); Yukiya Sassa, Nagoya (JP); Makoto Sakamaki, Obu (JP)

(73) Assignee: DENSO Corporation, Kariya (JP)

( * ) Notice: Subject to any disclaimer, the term of this patent is extended or adjusted under 35 U.S.C. 154(b) by 203 days.

(21) Appl. No.: 10/925,282

(22) Filed: Aug. 24, 2004

(65) Prior Publication Data
US 2005/0044863 A1    Mar. 3, 2005

(30) Foreign Application Priority Data
Aug. 27, 2003  (JP) .............................. 2003-303267

(51) Int. Cl.
*B60H 1/32* (2006.01)
(52) U.S. Cl. ........................... 62/244; 706/96; 382/106
(58) Field of Classification Search ................... 62/244, 62/239, 126; 382/103, 104, 106
See application file for complete search history.

(56) References Cited

U.S. PATENT DOCUMENTS

| | | | |
|---|---|---|---|
| 5,869,752 A * | 2/1999 | Klauber et al. ................ 73/116 |
| 6,078,853 A * | 6/2000 | Ebner et al. ................... 701/36 |
| 6,148,656 A * | 11/2000 | Breton ....................... 73/23.31 |
| 6,256,573 B1 * | 7/2001 | Higashimata ................. 701/96 |
| 6,400,405 B1 * | 6/2002 | Tomida et al. .......... 348/333.05 |
| 6,401,024 B1 * | 6/2002 | Tange et al. ................... 701/96 |
| 6,430,494 B1 * | 8/2002 | Inoue et al. .................... 701/96 |
| 6,810,330 B1 * | 10/2004 | Matsuura ...................... 701/301 |
| 6,865,138 B1 * | 3/2005 | Li ................................. 367/99 |
| 6,897,465 B1 * | 5/2005 | Remillard et al. ....... 250/559.38 |
| 6,963,657 B1 * | 11/2005 | Nishigaki et al. ............ 382/106 |
| 6,982,647 B1 * | 1/2006 | Kuge et al. .................. 340/576 |

FOREIGN PATENT DOCUMENTS

JP    6-220816 A  *  8/1994
JP    11-227444       8/1999

* cited by examiner

*Primary Examiner*—Mohammad M. Ali
(74) *Attorney, Agent, or Firm*—Harness, Dickey & Pierce, PLC

(57) ABSTRACT

In an air conditioning apparatus for a vehicle, a distance between the vehicle and a forward vehicle is detected. When the distance is equal to or less than a predetermined distance, a pollutant threshold of a concentration of exhaust gas pollutants is changed from a first level to a second level that is lower than the first level. Then, it is determined whether the concentration of exhaust gas pollutants is equal to or less than the second level. When the concentration is greater than the second level, an inside air mode is selected. When it is determined that the distance is greater than the predetermined distance, it is determined whether the concentration is equal to or greater than the first level of the pollutant threshold. When the concentration is greater than the first level, the inside air mode is selected.

9 Claims, 3 Drawing Sheets

AIR CONDITIONING APPARATUS FOR VEHICLE

CROSS REFERENCE TO RELATED APPLICATION

This application is based on Japanese Patent Application No. 2003-303267 filed on Aug. 27, 2003, the disclosure of which is incorporated herein by reference.

FIELD OF THE INVENTION

The present invention relates to an air conditioning apparatus for a vehicle, more particularly, relates to an automatic inside/outside air mode control of the same in accordance with a concentration of exhaust gas pollutants.

BACKGROUND OF THE INVENTION

In an air conditioning apparatus having an inside/outside air mode control function, the inside/outside air mode is automatically switched in accordance with a concentration of exhaust gas pollutants such as hydrocarbon (HC), CO carbon monoxide (CO) and nitrogen oxides ($NO_x$) contained in an exhaust gas. This kind of air conditioning apparatus is for example disclosed in Unexamined Japanese Patent Publication No. JP-A-11-227444.

In the above air conditioning apparatus, the concentration of exhaust gas pollutants is monitored by a exhaust gas sensor mounted on a vehicle. The concentration is compared to a pollutant threshold that is preset in a controller of the air conditioning apparatus. The detected concentration is determined whether it is greater than the pollutant threshold. When the concentration is greater than the pollutant threshold, an inside/outside air mode is automatically switched to an inside air mode. Therefore, polluted outside air is not introduced in a passenger compartment.

Incidentally, particulate matter (PM) may be contained in the exhaust gas, in addition to the above exhaust gas components. However, it is difficult to detect the particulate matter by using the exhaust gas sensor. Even if a large amount of particulate matter is contained in the exhaust gas, when the concentration of the exhaust gas pollutants is low, the detected concentration will be lower than the pollutant threshold. In this case, an outside air mode is selected and maintained. As a result, the exhaust gas including the particulate matter is introduced in the passenger compartment.

Because the exhaust gas containing the particulate matter looks dirt, a user may recognize that the outside air is polluted. Even if the outside air looks dirt because of the particulate matter and the user desires the inside air mode, when the concentration of the exhaust gas pollutants is small, the outside air mode is selected and maintained. As a result, the outside air containing the particulate matter is introduced in the passenger compartment. Thus, it is difficult to control the inside/outside air mode as desired by the user.

SUMMARY OF THE INVENTION

The present invention is made in view of the foregoing matters, and it is an object of the present invention to provide a vehicle air conditioning apparatus, which is capable of switching an inside/outside air mode as desired by user while restricting particulate matter contained in an exhaust gas from being introduced in a passenger compartment.

According to the present invention, an air conditioning apparatus for a vehicle includes a distance detector, a pollutant detector, an inside/outside air switching device and a controller. The distance detector detects a distance between the vehicle and a vehicle ahead. The pollutant detector detects a quantity of exhaust gas pollutants in an outside air. The inside/outside air switching device switches an inside/outside air mode between an inside air mode and an outside air mode. The controller controls the inside/outside air switching device to switch the inside/outside air mode. The controller is programmed such that the inside air mode is more likely to be selected in accordance with the quantity of exhaust gas pollutants detected by the pollutant detector when a detected distance is equal to or less than a predetermined distance in comparison with when the detected distance is greater than the predetermined distance.

Accordingly, when the distance from the forward vehicle is small, the inside air mode is more likely to be selected than the outside air mode. Therefore, even if the concentration of exhaust gas pollutants is low, the outside air is not introduced into a passenger compartment. Further, it is less likely that the particulate matter, which may be contained in the outside air, will be introduced into the passenger compartment.

Preferably, the controller stores a predetermined pollutant level to determine the quantity of exhaust gas pollutants. The predetermined pollutant level is set to different levels in accordance with the detected distance. The controller is programmed such that the outside air mode is selected when the detected distance is greater than the predetermined distance and the detected quantity of exhaust gas pollutants is equal to or less than a first predetermined pollutant level. When the detected distance is equal to or less than the predetermined distance, the predetermined pollutant level is set to a second predetermined pollutant level that is smaller than the first predetermined pollutant level. When the detected quantity is greater than the second predetermined pollutant level, the inside air mode is selected. Accordingly, when the distance is small, the inside air mode is selected by determining the quantity of exhaust gas pollutant based on the lower predetermined pollutant level. Therefore, even if the detected quantity of exhaust gas pollutant is low, the inside air mode is selected.

Alternatively, the quantity of exhaust gas pollutants is detected by two sensors having the same output level. A first sensor is provided with a first predetermined pollutant level and a second sensor is provided with a second predetermined pollutant level. The second predetermined pollutant level is lower than the first predetermined pollutant level. The controller is programmed such that the inside air mode is selected when the detected distance is equal to or less than the predetermined distance and the quantity of exhaust gas pollutants detected by the second sensor is greater than the second predetermined pollutant level. Accordingly, when the distance is small, the quantity of the exhaust gas pollutants is determined based on the lower predetermined pollutant level. Therefore, even if the detected concentration is low, the inside air mode is more likely to be selected.

Further, alternatively, the pollutant detector has a first sensor and a second sensor having the different output level. The output level of the second sensor is higher than the output level of the first sensor. The controller is programmed such that the inside air mode is selected when the detected distance is equal to or less than the predetermined distance and the quantity of exhaust gas pollutants detected by the second sensor is greater than a predetermined pollutant level. Accordingly, when the distance is small, the second sensor having the higher output level is used. Therefore, the inside air mode is more likely to be selected.

BRIEF DESCRIPTION OF THE DRAWINGS

Other objects, features and advantages of the present invention will become more apparent from the following detailed description made with reference to the accompanying drawings in which like parts are designated by like reference numbers and in which.

DETAILED DESCRIPTION OF EMBODIMENTS

Figure 1:
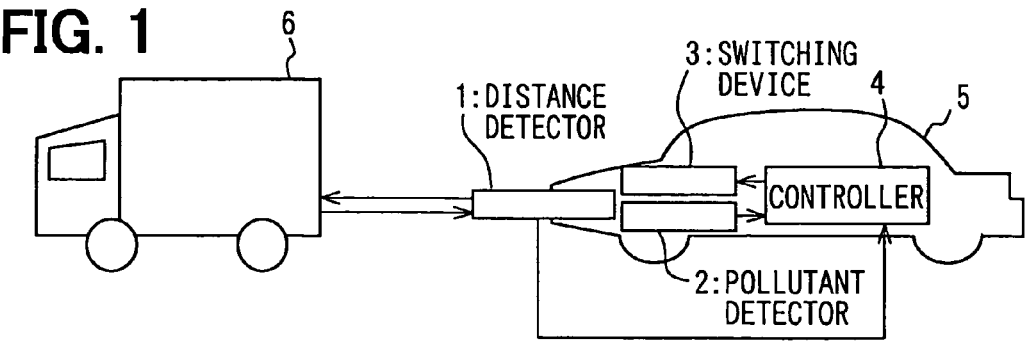
FIG. 1 is a schematic diagram of a vehicle air conditioning apparatus mounted on a vehicle according to a first embodiment of the present invention.

Embodiments of the present invention will be described hereinafter with reference to the drawing.

First Embodiment

Referring to FIG. 1, a vehicle air conditioning apparatus of the embodiment is mounted on a vehicle 5 and is constructed of a distance detector 1, a pollutant detector 2, an inside/outside air switching device 3, and a controller 4.

The distance detector 1 is provided to detect a distance D between the vehicle 5 and a forward vehicle 6. The distance detector 1 for example has a millimeter wave radar. The distance detector 1 radiates millimeter wave to the forward vehicle 6 and receives reflected light, thereby to detect the distance D. The distance information detected by the distance detector 1 is sent to the controller 4.

The pollutant detector 2 is provided to detect the degree of pollutants in an outside air, that is, a concentration of exhaust gas pollutants in the outside air. The exhaust gas pollutants are for example HC, CO, $NO_x$. The pollutant detector 2 for example includes an exhaust gas sensor (detecting means). Specifically, the exhaust gas sensor is constructed of semiconductor. The exhaust gas sensor detects the concentration of exhaust gas pollutants by using $SnO_2$. It is determined that the higher the concentration of the exhaust gas pollutants detected by the pollutant detector 2 is, the more the outside air is polluted. The information detected by the pollutant detector 2 is sent to the controller 4.

The inside/outside air switching device 3 is controlled by the controller 4. The inside/outside air switching device 3 is as well known constructed to switch an inside/outside air mode between an inside air mode and an outside air mode. The inside/outside air switching device 3 has an inside/outside air switching door (not shown). The inside/outside air switching door is operated to suck the outside air therein or to restrict the outside air from being sucked therein.

The controller 4 includes a microcomputer in which a control program relating to the air conditioning operation and various computing equations are stored. Although not illustrated, the controller 4 further includes a ROM, RAM, I/O port, A/D converter and the like. The controller 4 is provided with an input device (not shown) such as an air conditioner control panel. The inside/outside air mode is also manual selected through the air conditioner control panel.

In the controller 4, a pollutant threshold (predetermined pollutant level of exhaust gas) with respect to the detected concentration input from the exhaust gas sensor 2 is stored. The controller 4 is programmed to control the inside/outside air switching device 3 so that the inside air mode is selected when the detected concentration exceeds the pollutant threshold.

Figure 2:
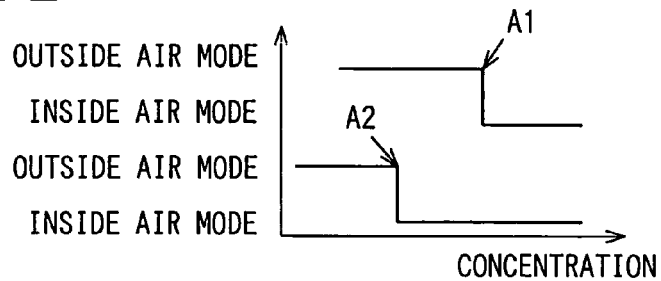
FIG. 2 is a chart showing a relationship between a concentration of exhaust gas pollutants and a pollutant threshold according to the first embodiment of the present invention.

Specifically, the threshold is set to different levels in accordance with the detected distance D, with respect to a predetermined distance preset in the controller 4. For example, as shown in FIG. 2, when the detected distance D is greater than the predetermined distance $X_0$, the pollutant threshold is set to a first level (first predetermined pollutant level) A1. When the distance D is equal to or less than the predetermined distance $X_0$, the threshold is changed to a second level (second predetermined pollutant level) A2 that is smaller than the first level A1. Further, when the detected concentration is greater than the first level A1 or the second level A2, the controller 4 controls the inside/outside air switching device 3 so that the inside air mode is selected.

In this way, the pollutant threshold is changed in accordance with the distance D because effects of the exhaust gas from the forward vehicle 6 is different depending on the distance. Especially, when the distance D is small, the pollutant threshold is set to the lower level. Therefore, even if the concentration is small, the inside air mode is selected. Thus, the outside air is not introduced in a passenger compartment. Further, the particulate matter will not be introduced in the passenger compartment.

On the other hand, when the distance D is large, the effect of the exhaust gas from the forward vehicle 6 is small. Thus, the pollutant threshold is set to the higher level A1. Thus, the outside air mode is more likely to be selected. Accordingly, the outside air is introduced in the passenger compartment.

Here, the predetermined distance $X_0$ can be changed to an optional value by a user's liking. For example, if the user more likes the inside air mode, the predetermined distance $X_0$ is set to a distance X1 that is greater than the predetermined distance $X_0$. By this, the inside air mode is selected based on the distance X1 that is greater than the distance $X_0$. On the other hand, when the user more likes the outside air mode, the predetermined distance $X_0$ is set to a distance X2 that is smaller than the predetermined distance $X_0$. The outside air mode is selected based on the distance X2 that is smaller than the distance $X_0$. Accordingly, even if the vehicle 5 comes closer to the front vehicle 6, the outside air mode is more likely to be selected.

In this way, the predetermined distance $X_0$ can be varied to the distance set by the user and the switching of the inside/outside air mode is performed based on the distance set by the user. Here, the predetermined distance $X_0$ is for example 20 m, and it is changeable by the user's liking as above.

When the inside/outside air mode is manually switched by the user through the air conditioner control panel (not shown), the controller 4 memorizes the distance D at that time. From the next operation, the controller 4 considers this distance as the predetermined distance $X_0$ and performs the control based on the predetermined distance. In this way, the controller 4 has a learning function.

Figure 3:
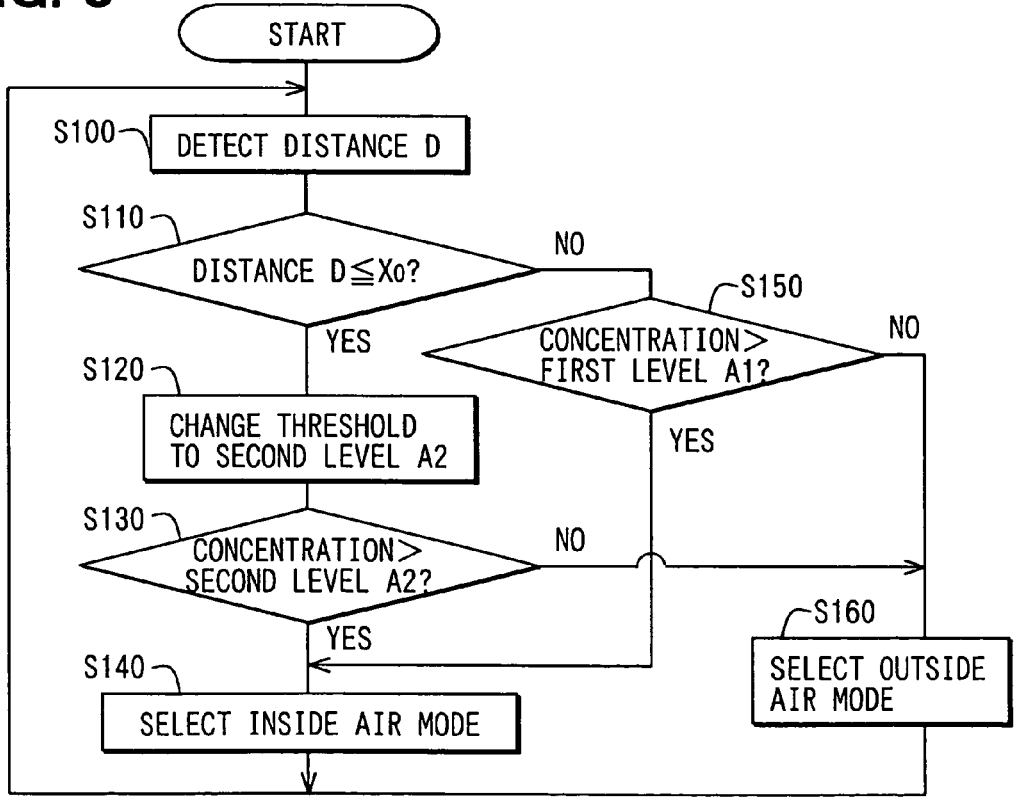
FIG. 3 is a flow chart for showing an inside/outside air mode switching control according to the first embodiment of the present invention.

Next, operation of the controller 4 will be described with reference to the flow chart shown in FIG. 3. Here, when the inside/outside air mode is already decided by the manual inside/outside air switch of the air conditioner control panel, the following control is not executed. The predetermined distance $X_0$ is set before starting the control of the flow chart. The control is executed based on the predetermined distance $X_0$.

First, at step S100, the distance D from the forward vehicle 6 is detected by the distance detector 1. The millimeter wave is irradiated to the forward vehicle 6 from the distance detector 1, so the distance D is determined based on the reflected light. Then, the detected distance D is sent to the controller 4.

Next, at step S110, it is determined whether the distance D is equal to or less than the predetermined distance $X_0$. When it is determined that the distance D is equal to or less than the predetermined distance $X_0$, the pollutant threshold is changed from the first predetermined pollutant level A1 to the second predetermined pollutant level A2, which is lower than the first predetermined pollutant level A1, at step S120. On the other hand, when it is determined that the distance D is greater than the predetermined distance $X_0$, the control proceeds to step S150.

At step S130, it is determined whether the detected concentration of the exhaust gas pollutants is greater than the second predetermined pollutant level A2. When it is determined that the detected concentration is greater than the second predetermined pollutant level A2, the inside air mode is selected at step S140. Then, the control returns to step S100. On the other hand, when it is determined that the detected concentration is equal to or less than the second predetermined pollutant level A2, the control proceeds to step S160.

When it is determined that the detected distance is greater than the predetermined distance $X_0$, it is determined whether the concentration of the exhaust gas components is greater than the first predetermined pollutant level A1 at step S150. When it is determined that the concentration is greater than the first predetermined pollutant level A1, the control proceeds to step S140, so the inside air mode is selected. On the other hand, when it is determined that the detected concentration is equal to or less than the first predetermined pollutant level A1, the outside air mode is selected at step S160. Then, the control returns to step S100.

In this way, the pollutant threshold with respect to the exhaust gas pollutants is changed in accordance with the distance D. Further, the inside/outside air mode is switched based on the threshold.

When the distance D is large, the effect of the exhaust gas from the forward vehicle 6 will be small. Therefore, the pollutant threshold is not changed to the lower level. On the other hand, when the distance is small, the threshold is changed from the first predetermined pollutant level A1 to the lower second predetermined pollutant level A2.

Since it is determined whether the detected concentration is greater than the second predetermined pollutant level A2, which is lower than the first predetermined pollutant level A1, the inside air mode is more likely to be selected even if the detected concentration is low. That is, when the distance D is small, even if the detected concentration of the exhaust gas pollutant is low, the outside air mode is not introduced into the passenger compartment. Therefore, it is less likely that the exhaust gas pollutants such as HC, CO, $No_x$. will be introduced into the passenger compartment. Further, it is less likely that the particulate matter, which may be contained in the exhaust gas, will be introduced into the passenger compartment. In this way, the inside/outside air mode can be switched as desired by the user, such as when the exhaust gas is visibly dirty and the user wants the inside air mode.

Second Embodiment

In the second embodiment, the pollutant detector 2 has two exhaust gas sensors. Hereafter, the description will be mainly made regarding the part different from the first embodiment.

Two exhaust gas sensors have substantially the same performance. That is, the two sensors have the same sensitivity, and output levels of the concentration detected by the two sensors are the same. In the controller 4, two different thresholds are set for the two exhaust gas sensors.

For example, a first sensor (first detecting means) is provided with a first threshold A1 and a second sensor (second detecting means) is provided with a second threshold A2. The first threshold A1 is greater than the second threshold A2.

Because the two sensors have the different thresholds A1, A2, it is not necessary to change the threshold during the control of the second embodiment. Accordingly, in the flow chart shown in FIG. 4, the step S120 is not included.

Figure 4:
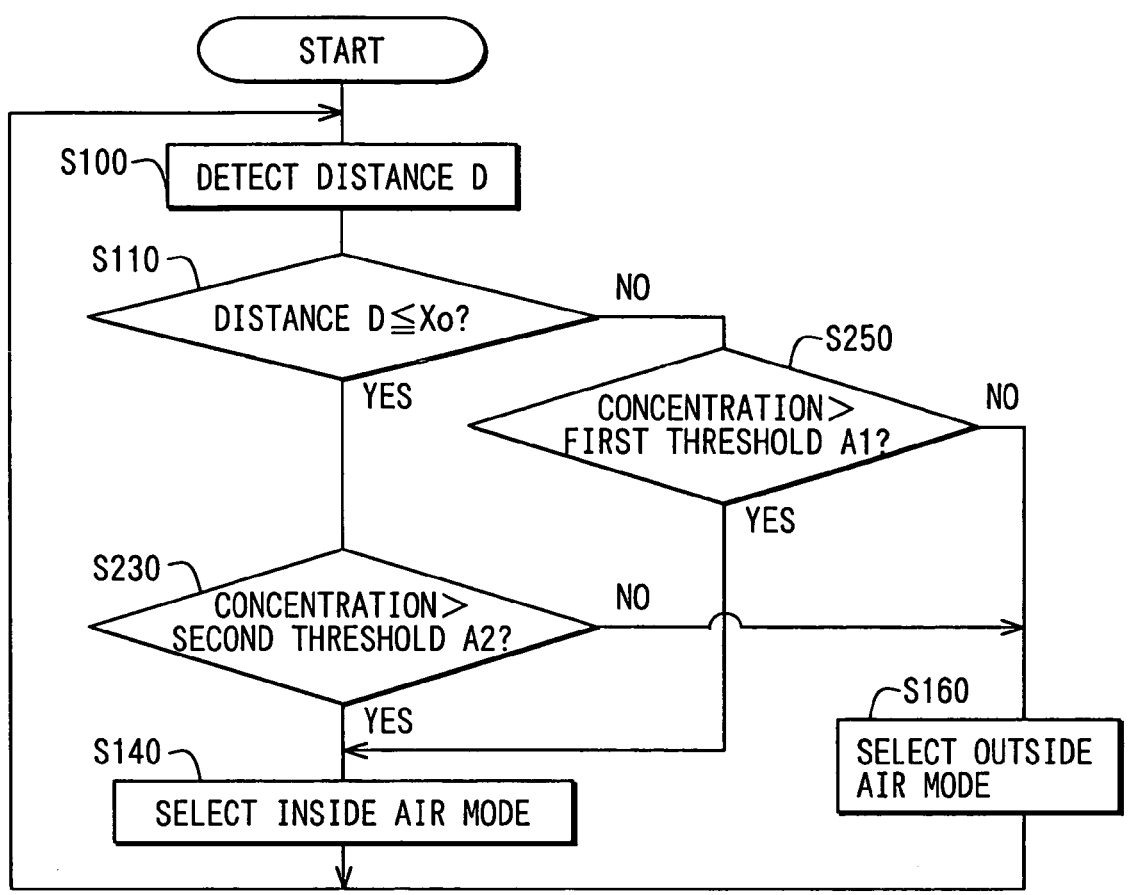
FIG. 4 is a flow chart for showing an inside/outside air mode switching control according to a second embodiment of the present invention.

Next, the control of the second embodiment will be described with reference to the flow chart shown in FIG. 4. Hereafter, steps that are different from the first embodiment will be mainly described.

When it is determined that the distance D is equal to or less than the predetermined distance $X_0$, it is determined whether a concentration of the exhaust gas components detected by the second sensor is greater than the second threshold A2 at step S230. If it is determined that the detected concentration of the second sensor is greater than the second threshold A2, the control proceeds to the step 140.

When it is determined that the distance D is greater than the distance $X_0$, it is determined whether the concentration detected by the first sensor is greater than the first threshold A1 at step S250. When it is determined that the detected concentration of the first sensor is greater than the first threshold A1, the control proceeds to the step S140. On the other hand, when it is determined that the detected concentration of the first sensor is equal to or lower than the first threshold A1 at step S250, the outside air mode is selected at the step S160.

Because the second threshold A2 is lower than the first threshold A1, the concentration detected by the second sensor is more likely to be greater than the second threshold A2. Accordingly, even if the concentration is low, the inside air mode is selected.

At the step S250, the concentration is monitored based on the first threshold A1 that is greater than the second threshold A2. Therefore, if the concentration is large, the inside air mode is less likely to be selected.

Similar to the first embodiment, when the distance D is small and the concentration of the exhaust gas pollutant is low, the inside/outside air mode is switched to the inside air mode. Therefore, it is less likely that the particulate matter will be introduced in the passenger compartment. The outside air, which is visibly dirty, is not introduced in the passenger compartment. Therefore, the inside/outside air mode can be switched in accordance with the user's desire.

Third Embodiment

In the third embodiment, the pollutant detector 2 has the two exhaust gas sensors. Here, the performance of the two sensors is different from each other. That is, the sensitivity of the two sensors is different and therefore, output levels of the concentration are different. For example, the output of a first sensor (first detecting means) is lower than that of a second sensor (second detecting means).

In the third embodiment, the same threshold is set to the different two sensors. When the distance D is greater than the predetermined distance $X_0$, the first sensor having the performance lower than the second sensor is used. With this, even if the detected concentration is high, the detected concentration is less likely to exceed the threshold. Therefore, the outside air mode is more likely to be selected. On the other hand, when the distance D is equal to or less than the predetermined distance $X_0$, the second sensor is used. With this, the detected concentration is less likely to exceed the threshold, even if the concentration is low. Therefore, the inside air mode is more likely to be selected.

Since the two different sensors are used in accordance with the distance D, the step S120 is not included in the control of the third embodiment.

Figure 5:
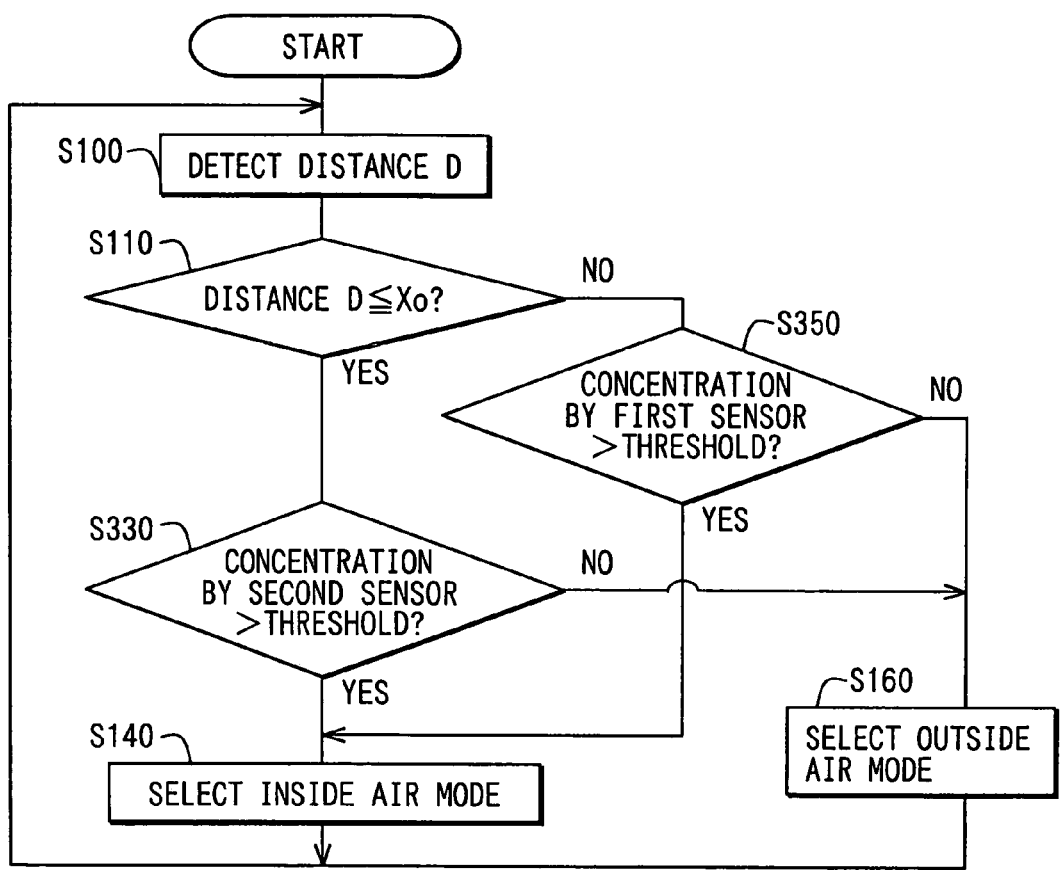
FIG. 5 is a flow chart for showing an inside/outside air mode switching control according to a third embodiment of the present invention.

Next, the control of the third embodiment will be described with reference to the flow chart shown in FIG. 5. Hereafter, steps different from the first and the second embodiments will be mainly described.

When it is determined that the distance D is equal to or less than the predetermined distance $X_0$, the concentration of the exhaust gas components is detected by using the second sensor having the higher performance. At step S330, it is determined whether the concentration of the exhaust gas pollutants detected by the second sensor is greater than the threshold. Therefore, even if the concentration is low, the concentration is more likely to be greater than the threshold. Accordingly, the inside air mode is more likely to be selected.

When it is determined that the distance D is greater than the predetermined distance $X_0$, the concentration of the exhaust gas pollutants is detected by using the first sensor. At step S350, it is determined whether the concentration detected by the first sensor is greater than the threshold. Therefore, the outside air mode is more likely to be selected.

In this way, the two different sensors are used with respect to the single threshold. Also in this case, the advantages similar to the first and the second embodiments are provided. Therefore, when the distance D is small and the concentration detected by the second sensor, which has a performance higher than the first sensor, exceeds the threshold, the inside/outside air mode is switched to the inside air mode. Accordingly, the outside air, which may include particulate matter, is not introduced into the passenger compartment. In this way, the inside/outside air mode is switched as desired by the user.

OTHER EMBODIMENTS

In the first to third embodiments, the millimeter wave radar is used for the distance detector 1. Alternatively, CCD camera having image processing function can be used. The distance D from the forward vehicle 6 is determined based on an image captured by the CCD camera.

In the first embodiment, the threshold of the concentration is changed from the first predetermined pollutant level A1 to the lower second predetermined pollutant level A2 in accordance with the distance D. However, the threshold is changed linearly in accordance with the distance D. Also in this case, the advantage similar to the first embodiment can be provided. By changing the threshold linearly, the inside/outside air mode is switched further promptly in accordance with the degree of pollutant of the outside air.

The present invention is not limited to the above embodiments, but may be implemented in other ways without departing from the spirit of the invention.

What is claimed is:

1. An air conditioning apparatus for a vehicle, comprising:
 a distance detector that detects a distance between the vehicle and a vehicle ahead;
 a pollutant detector that detects a quantity of exhaust gas pollutants in an outside air;
 an inside/outside air switching device that switches an inside/outside air mode between an inside air mode and an outside air mode; and
 a controller that controls the inside/outside air switching device to switch the inside/outside air mode, wherein
 the controller stores a predetermined pollutant level to determine the quantity of exhaust gas pollutants, the predetermined pollutant level is set to different levels in accordance with the detected distance, and
 the controller is programmed such that the outside air mode is selected when the detected distance is greater than a predetermined distance and a detected quantity of exhaust gas pollutants is equal to or less than a first predetermined pollutant level, and the inside air mode is selected when the detected distance is equal to or less than the predetermined distance and the detected quantity of exhaust gas pollutants is greater than a second predetermined pollutant level that is lower than the first predetermined pollutant level.

2. The air conditioning apparatus according to claim 1, wherein the predetermined distance preset in the controller is changeable.

3. The air conditioning apparatus according to claim 1, wherein
 the controller memorizes a distance at a time the inside air mode is manually selected, and
 the controller is programmed to set the distance as the predetermined distance.

4. An air conditioning apparatus for a vehicle, comprising:
 a distance detector that detects a distance between the vehicle and a vehicle ahead;
 a pollutant detector that detects a quantity of exhaust gas pollutants in an outside air;
 an inside/outside air switching device that switches an inside/outside air mode between an inside air mode and an outside air mode; and
 a controller that controls the inside/outside air switching device to switch the inside/outside air mode, wherein
 the pollutant detector has a first detecting means and a second detecting means for detecting the quantity of exhaust gas pollutants, wherein the first detecting means and the second detecting means have the same output level,
 the controller stores a first predetermined pollutant level and a second predetermined pollutant level to determine the quantity of exhaust gas pollutants, the second predetermined pollutant level being lower than the first predetermined pollutant level, and
 the controller is programmed such that the outside air mode is selected when a detected distance is greater than a predetermined distance and a quantity of exhaust gas pollutants detected by the first detecting means is equal to or less than the first predetermined pollutant level, and the inside air mode is selected when the detected distance is equal to or less than the predetermined distance and a quantity of exhaust gas pollutants detected by the second detecting means is greater than the second predetermined pollutant level.

5. The air conditioning apparatus according to claim 4, wherein the predetermined distance preset in the controller is changeable.

6. The air conditioning apparatus according to claim 4, wherein
- the controller memorizes a distance at a time the inside air mode is manually selected, and
- the controller is programmed to set the distance as the predetermined distance.

7. An air conditioning apparatus for a vehicle, comprising:
- a distance detector that detects a distance between the vehicle and a vehicle ahead;
- a pollutant detector that detects a quantity of exhaust gas pollutants in an outside air;
- an inside/outside air switching device that switches an inside/outside air mode between an inside air mode and an outside air mode; and
- a controller that controls the inside/outside air switching device to switch the inside/outside air mode, wherein
- the pollutant detector has a first detecting means and a second detecting means to determine the quantity of exhaust gas pollutants, wherein an output level of the second detecting means is higher than that of the first detecting means, and
- the controller is programmed such that the outside air mode is selected when the detected distance is greater than a predetermined distance and an output of the first detecting means is equal to or less than a predetermined pollutant level, and the inside air mode is selected when the detected distance is equal to or less than the predetermined distance and an output of the second detecting means is greater than the predetermined pollutant level.

8. The air conditioning apparatus according to claim 7, wherein the predetermined distance preset in the controller is changeable.

9. The air conditioning apparatus according to claim 7, wherein
- the controller memorizes a distance at a time the inside air mode is manually selected, and
- the controller is programmed to set the distance as the predetermined distance.

* * * * *